United States Patent
Kovales et al.

(10) Patent No.: US 8,654,939 B2
(45) Date of Patent: Feb. 18, 2014

(54) RECORDING AND RECEIVING VOICE MAIL WITH FREEFORM BOOKMARKS

(75) Inventors: Renee M. Kovales, Cary, NC (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 2808 days.

(21) Appl. No.: 09/782,772

(22) Filed: Feb. 13, 2001

(65) Prior Publication Data

US 2002/0110226 A1   Aug. 15, 2002

(51) Int. Cl.
   *H04M 1/64*   (2006.01)
(52) U.S. Cl.
   USPC .......................................... 379/88.23; 379/69
(58) Field of Classification Search
   USPC ...................... 379/88.01–88.28, 67.1, 207.13; 704/210, 270
   See application file for complete search history.

(56) References Cited

U.S. PATENT DOCUMENTS

| | | | | | |
|---|---|---|---|---|---|
| 5,243,643 | A | * | 9/1993 | Sattar et al. | 379/88.23 |
| 5,481,597 | A | * | 1/1996 | Given | 379/88.23 |
| 5,530,950 | A | * | 6/1996 | Medan et al. | 379/88.24 |
| 5,655,006 | A | * | 8/1997 | Cox et al. | 379/67.1 |
| 5,661,783 | A | * | 8/1997 | Assis | 379/88.01 |
| 5,692,038 | A | * | 11/1997 | Kraus et al. | 379/207.13 |
| 5,708,698 | A | * | 1/1998 | Akahane | 379/88.23 |
| 5,717,741 | A | * | 2/1998 | Yue et al. | 379/88.12 |
| 5,721,827 | A | * | 2/1998 | Logan et al. | 709/217 |
| 5,742,736 | A | * | 4/1998 | Haddock | 704/270 |
| 5,797,124 | A | * | 8/1998 | Walsh et al. | 704/275 |
| 5,862,209 | A | * | 1/1999 | Kapsales | 379/214.01 |
| 5,943,402 | A | * | 8/1999 | Hamel et al. | 379/88.26 |
| 6,055,495 | A | * | 4/2000 | Tucker et al. | 704/210 |
| 6,199,076 | B1 | * | 3/2001 | Logan et al. | 715/501.1 |
| 6,330,436 | B1 | * | 12/2001 | Zidel | 455/412.2 |
| 6,393,107 | B1 | * | 5/2002 | Ball et al. | 379/88.13 |
| 6,442,243 | B1 | * | 8/2002 | Valco et al. | 379/67.1 |
| 6,449,345 | B1 | * | 9/2002 | Grimes | 379/88.23 |
| 6,567,506 | B1 | * | 5/2003 | Kermani | 379/88.01 |
| 6,587,033 | B1 | * | 7/2003 | Morishima | 340/7.55 |

(Continued)

*Primary Examiner* — Joseph T Phan
(74) *Attorney, Agent, or Firm* — Steven L. Nichols; Van Cott, Bagley, Cornwall & McCarthy P.C.

(57) ABSTRACT

Methods, systems, computer program products, and methods of doing business by providing bookmarks for voice mail messages in order to facilitate improved navigation thereof. A bookmark is preferably conveyed by the caller leaving a voice mail message to indicate information such as a change in the topic of the message, or a particular important passage within the message, or perhaps to identify some information for special treatment (such as a telephone number and time of day at which the call can be returned). Once the message has been bookmarked, the listener can navigate the message more efficiently (for example, by listening to a few seconds of each topic and then skipping to the next topic, or by listening only to the special information) and can also perform actions on parts of the voice mail message (such as forwarding only a selected segment to a third party, while keeping the remainder of the message confidential). Optionally, audio cues may be rendered with the voice mail message as it is played to the listener, where audio cues are sounds that are either "incorporated in" with the audio rendering as a separate (background) audio stream or inserted in-line within the message. (For example, audio cues may change to signify that the bookmarked topics of the message change, or many announce the type of bookmark associated with an upcoming audio message segment).

21 Claims, 14 Drawing Sheets

(56) References Cited

U.S. PATENT DOCUMENTS

| | | | |
|---|---|---|---|
| 6,625,261 B2 * | 9/2003 | Holtzberg | 379/88.23 |
| 6,775,557 B2 * | 8/2004 | Tsai | 455/556.1 |
| 6,789,107 B1 * | 9/2004 | Bates et al. | 709/206 |
| 6,832,350 B1 * | 12/2004 | Bates et al. | 715/501.1 |
| 6,876,729 B1 * | 4/2005 | Kuter et al. | 379/88.22 |
| 6,970,906 B1 * | 11/2005 | Parsons et al. | 709/204 |
| 7,003,083 B2 * | 2/2006 | Kovales et al. | 379/88.16 |
| 2002/0114431 A1 * | 8/2002 | McBride et al. | 379/88.21 |
| 2004/0008827 A1 * | 1/2004 | Martin et al. | 379/67.1 |
| 2004/0247098 A1 * | 12/2004 | Valco et al. | 379/88.22 |

\* cited by examiner

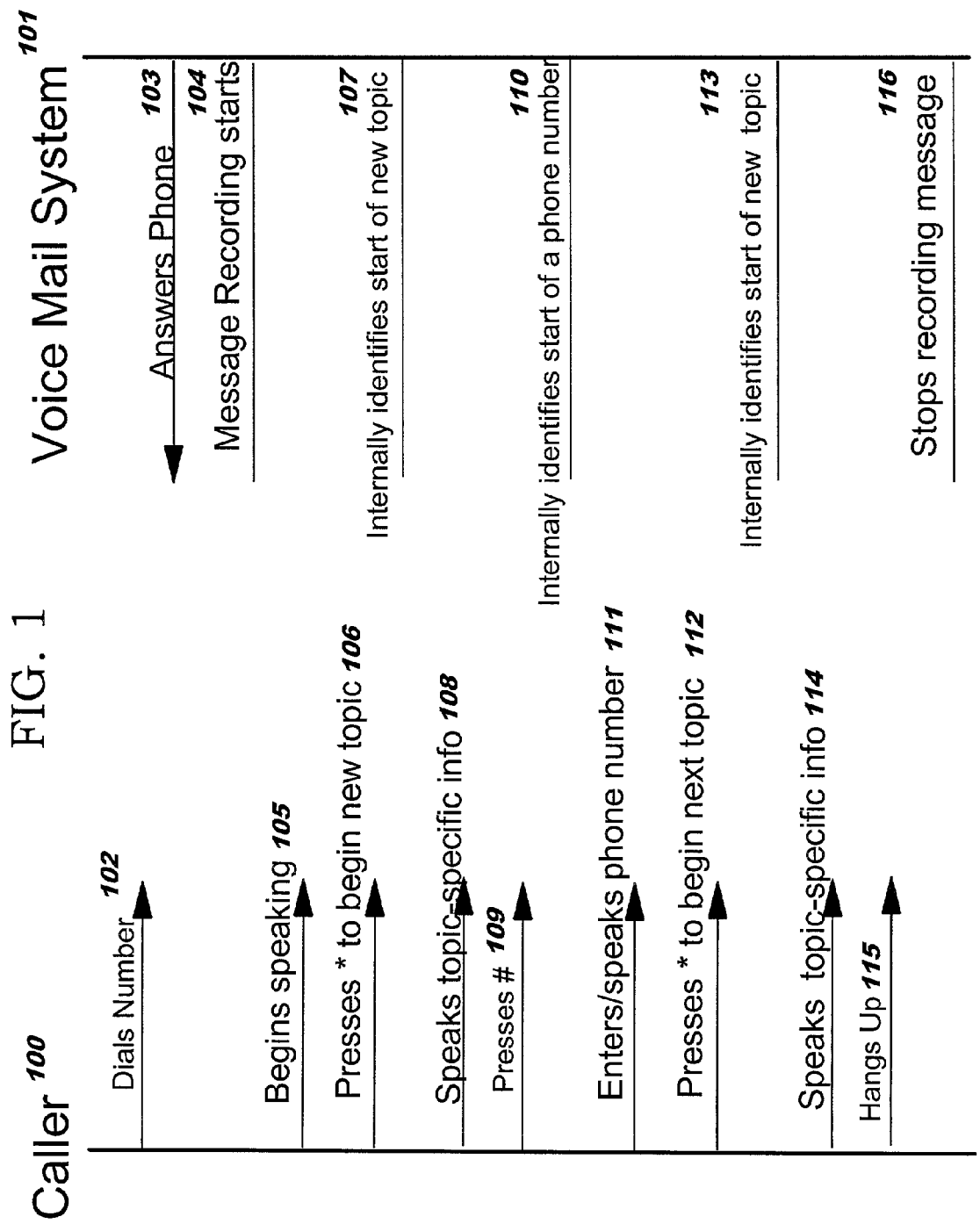

FIG. 3A

To listen to the entire message, press #0.
To listen to segment n, press #n.
To access options for tagged field m, press *m.
To exit, press 99.

FIG. 3B

To delete this segment, press 1.
To save this segment, press 2.
To continue, press 3.
To forward this segment, press 4.

FIG. 3C

To delete this message, press 1.
To save this message, press 2.
To continue, press 3.
To forward this message, press 4.

FIG. 3D

To listen to a tagged field, press 1.
To execute an action, press 2.
To continue, press 3.
To forward this tagged field, press 4.

```
#define MAX_VMAIL_SEGMENTS 1000    /* arbitrary value */   501
#define MAX_TAGGED_ENTRIES 50      /* arbitrary value */

Struct tagged_field  502
{
    Int tagged_field_type;      /* phone number, email addr, url, etc.         */
    FILE *tagged_field_loc;     /* location of data for this tagged field      */
                                /* this could alternately be stored in this structure. */
}

Struct vmail_segment  503
{
    FILE *data_loc;             /* location of data for this part of the voice mail  */
                                /* this could alternately be stored in this structure. */

Struct tagged_field  tagged_field_array[MAX_TAGGED_ENTRIES];
}

Struct vmail_segment vmail_array[MAX_VMAIL_SEGMENTS];  504
```

FIG. 5B

510
define MAX_VMAIL_SEGMENTS 1000     /* arbitrary value */  511
define MAX_TAGGED_ENTRIES 50   /* arbitrary value */

Struct tagged_field 512
{
    Int tagged_field_type;      /* phone number, email addr, url, etc.   */
    Int tagged_field_offset;    /* offset of the tagged field in data_loc */
    Int tagged_field_length;    /* need to know where the end of the field is */
}

Struct vmail_segment 513
{
    FILE *data_loc;             /* location of data for this segment of the voice mail   */
                                /* this could alternately be stored in this structure.  */

Struct tagged_field  tagged_field_array[MAX_TAGGED_ENTRIES];
}

Struct vmail_segment vmail_array[MAX_VMAIL_SEGMENTS];514

FIG. 5C

520
FILE *vmail_msg; 521

FIG. 5D

530 define MAX_VMAIL_ELEMENTS 1000    /* arbitrary value */ 531

FILE *vmail_array[MAX_VMAIL_ELEMENTS];532

```
#define MAX_VMAIL_SEGMENTS 1000    /* arbitrary value */    541
#define MAX_TAGGED_ENTRIES 50  /* arbitrary value */

Struct tagged_field 542
{
    Int tagged_field_type;      /* phone number, email addr, url, etc.       */
    FILE *tagged_field_loc;     /* location of data for the tagged_field     */
                                /* this could alternately be stored in this structure. */
}

Struct vmail_segment 543
{
    FILE *data_loc;             /* location of data for this part of the voice mail  */
                                /* this could alternately be stored in this structure. */

Struct tagged_field  tagged_field_array[MAX_TAGGED_ENTRIES];
}

Struct vmail_msg_struct 544
{
    FILE *caller_name;
    FILE *caller_phone_number;
    Struct vmail_segment vmail_segment_array[MAX_VMAIL_SEGMENTS];
} vmail_msg;
```

FIG. 5F

*550* define MAX_VMAIL_SEGMENTS 1000    /* arbitrary value */ *551*

Struct vmail_msg_struct *552*
{
    FILE *caller_name;
    FILE *caller_phone_number;
    FILE *desired_callback_time;
    FILE *vmail_segment_array[MAX_VMAIL_SEGMENTS];
} vmail_msg;

FIG. 5G

560 define MAX_VMAIL_ELEMENTS 1000   /* arbitrary value */  561

Struct vmail_segment 562
{
    INT   importance_level;   /* importance level associated w/each segment - default  */
                                   /* may be set to 5 (average). */
    FILE *data_loc;          /* location of data for this element of the voice mail */
                                   /* this could alternately be stored in this structure. */
}

Struct vmail_segment *vmail_array[MAX_VMAIL_ELEMENTS]; 563

RECORDING AND RECEIVING VOICE MAIL WITH FREEFORM BOOKMARKS

RELATED INVENTIONS

The present invention is related to the following commonly-assigned U.S. patents, both of which were filed concurrently herewith and are hereby incorporated herein by reference: U.S. Ser. No. 09/782,773, entitled "Selectable Audio and Mixed Background Sound for Voice Messaging System", and U.S. Ser. No. 09/782,564, entitled "Audio Renderings for Expressing Non-Audio Nuances".

BACKGROUND OF THE INVENTION

1. Field of the Invention

The present invention relates to a computer system, and deals more particularly with methods, systems, computer program products, and methods of doing business by providing bookmarks for voice mail messages in order to facilitate improved navigation and processing thereof.

2. Description of the Related Art

Face-to-face communication between people involves many parallel communication paths. We derive information from body language, from words, from intonation, from facial expressions, from the distance between our bodies, and so forth. Distance communication, such as phone calls, e-mail exchange, and voice mail, on the other hand, involves only a few of these communication paths. Users may therefore have to take extra actions (which may or may not be successful) if they wish to try to overcome the limitations so imposed.

Distance communicating is becoming more prevalent in our society. Voice mail systems became widely used in years past, and in more recent years electronic mail systems have become common, with the popularity and pervasiveness of e-mail continuing to grow. When communicating by e-mail, message creators often try to overcome the limitations of distance communications by techniques such as using different font sizes, colors, emoticons (i.e. combinations of text symbols which bear a resemblance to facial expressions), and so forth to express non-text information. This non-text information includes emphasis, emotion, irony, etc. When communicating in person, the speaker can use changes in body language to indicate a change in subject. In e-mail messages, the paragraph structure and use of bolding and italics gives clues as to the number and importance of topics. Thus, e-mail users try to overcome the limitations of distance communications by using visual clues for both semantic and contextual meaning. Further, visual clues such as paragraph distinctions are perceivable as soon as the page is displayed, providing a "broadside" perception of the message.

Voice mail has a different set of problems. While the recipient has the benefit of the nuances available through voice, the recipient does not have the advantages of the other parallel forms of communication which are available in person. Unlike e-mail, with voice mail the recipient does not have the advantage of broadside perception of the message. Thus, in a voice mail message, it may be difficult for the listener to appreciate when one topic has ended and another has begun. Additionally, voice mail users listening to their messages from a telephone do not have the ability to navigate within the stored voice mail in a controlled fashion. The voice mail recipient is hampered in the retrieval of, and subsequent actions on, the message due to the inability to act on parts of the voice mail message, as can be done with e-mail messages. (While some existing voice mail systems allow the listener to speed up the message, or skip the message, none are known to the present inventors which allow the originator of the message to specify where the topics lie, or which enable use of such identified topics for actions by the listener.)

Accordingly, what is needed is a technique that alleviates these problems in distance communications, providing a more flexible and more productive way for people to communicate using voice mail messages.

SUMMARY OF THE INVENTION

An object of the present invention is to provide a technique that alleviates disadvantages in distance communications.

Another object of the present invention is to provide this technique by enabling a more flexible and more productive way for people to communicate using voice mail messages.

A further object of the present invention is to provide these advantages by augmenting a voice mail message with bookmarks.

Still another object of the present invention is to provide these advantages by using the bookmarks to navigate stored voice mail messages more efficiently.

Yet another object of the present invention is to provide these advantages by using the bookmarks to enable acting upon partial voice mail messages.

Yet another object of the present invention is to provide new methods of doing business, whereby enhanced voice mail systems can be provided to end-users, and/or features of existing systems can be improved.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in a first aspect the present invention provides methods, systems, computer program products, and methods of doing business by providing bookmarks in voice mail messages.

This technique comprises providing one or more bookmarks for a voice mail message left by a caller in order to create a bookmarked message. It may also comprise creating the resulting bookmarked message, and playing the bookmarked message to a listener.

The bookmarks may be used for a number of different purposes, including but not limited to: segmenting the voice mail message according to one or more topics; marking one or more segments as having one or more different degrees of importance (in which case a default degree of importance may be associated with segments not otherwise marked); identifying one or more special types of information in the voice mail message (such as a callback telephone number for the caller; a callback time and/or date to use when responding to the voice mail message); identifying the caller's name; providing a Uniform Resource Locator or an e-mail address; and providing a protection or confidentiality indicator for the message or some portion thereof.

The bookmarks may be used to navigate from one topic or segment of the voice mail message to another, and/or to perform actions selectively on one or more segments, where the actions include, but are not limited to: saving; deleting; forwarding; skipping; listening; or repeating playback of segments; and/or marking a selected segment as protected or confidential (for example, prior to forwarding the segment to another party).

The bookmarks may also be used to navigate among segments of the voice mail message having one or more of the different degrees of importance, and/or to perform actions (of the type just described) selectively on one or more of these segments.

Similarly, the bookmarks may be used to navigate to one or more of the special types of information in the voice mail message, and/or to selectively perform actions (of the type described above) on one or more of these special types of information. When one of the special types of information is a Uniform Resource Locator, then one of the actions may comprise establishing a connection to that URL.

In some embodiments, the bookmarks and the voice mail message may be stored separately; in other embodiments, they may be stored in an intermingled manner. (Or, selected types of the bookmarks may be separately stored, while others are intermingled.)

The number of bookmarked topics in the voice mail message may be announced to a listener. Similarly, the number of different degrees of importance (and/or the number of segments in these different degrees of importance) may be announced, as may the number of special types of information.

Optionally, particular ones of the special types of information may be treated as required, in which case the caller may be prompted to provide input for each required one for which no bookmark is otherwise provided.

As another option, one or more audio cues may be associated with one or more of the bookmarks. In this case, the technique may further comprise playing the bookmarked message to a listener while also playing the associated audio cues along with respective portions (e.g. segments and/or special indicators) of the voice mail message which correspond to the bookmarks. The audio cues may be incorporated in with the respective portions of the voice mail message, or may be played in-line (i.e. between the portions).

The present invention will now be described with reference to the following drawings, in which like reference numbers denote the same element throughout.

BRIEF DESCRIPTION OF THE DRAWINGS

FIG. 1 is a flow diagram illustrating an example of how a caller may enhance his or her voice mail message by providing bookmarks, according to preferred embodiments of the present invention;

FIGS. 3A through 3D are tables showing examples of command choices that may be provided to a listener for use in navigating the enhanced voice mail messages of the present invention;

FIGS. 5A through 5G depict examples of data structures that may be used to facilitate implementation of preferred embodiments of the present invention.

DESCRIPTION OF THE PREFERRED EMBODIMENTS

Figure 2A:
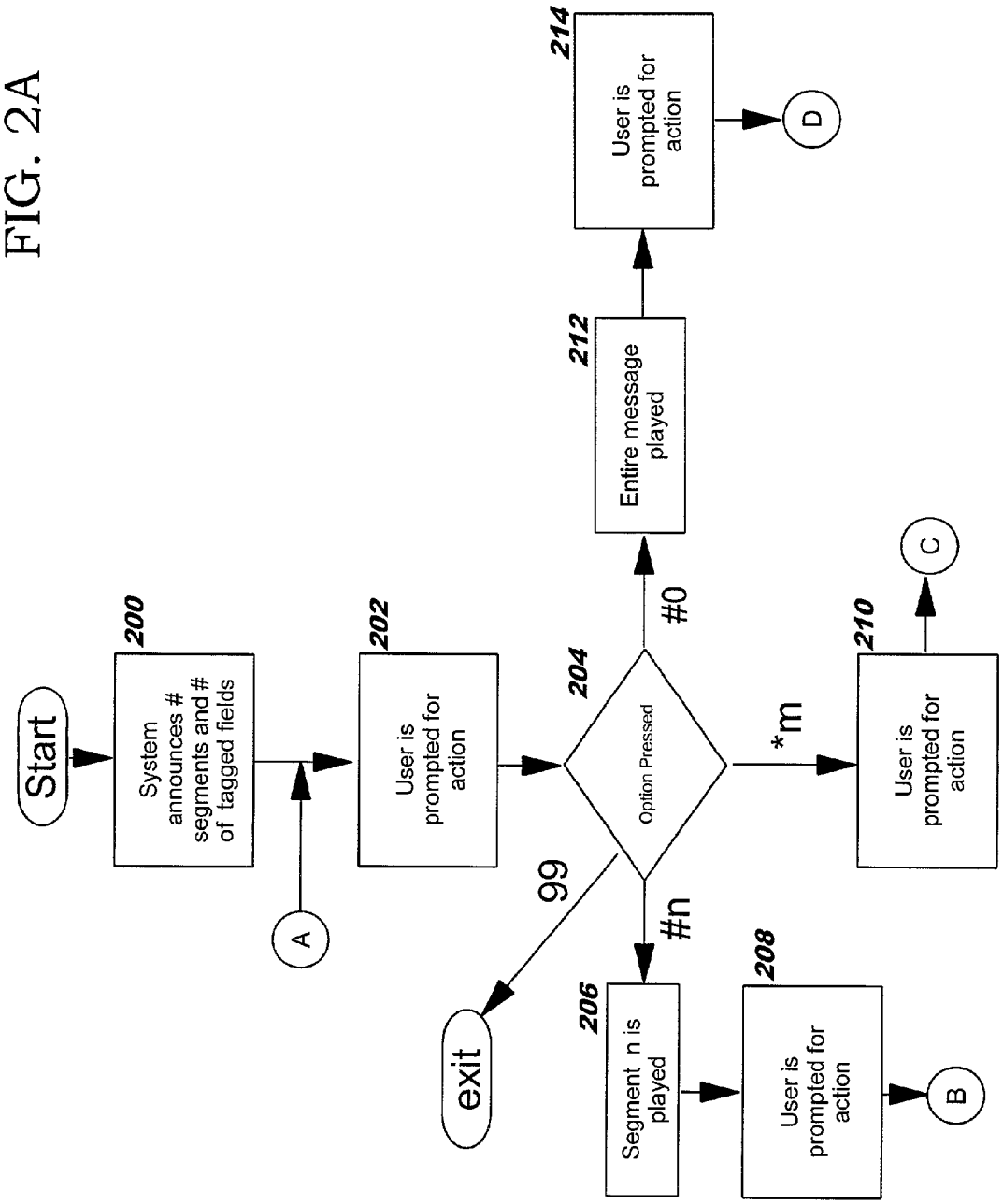
FIGS. 2A through 2D provide a flowchart illustrating logic that may be used to implement preferred embodiments of the voice mail playback features of the present invention.
Figure 2B:
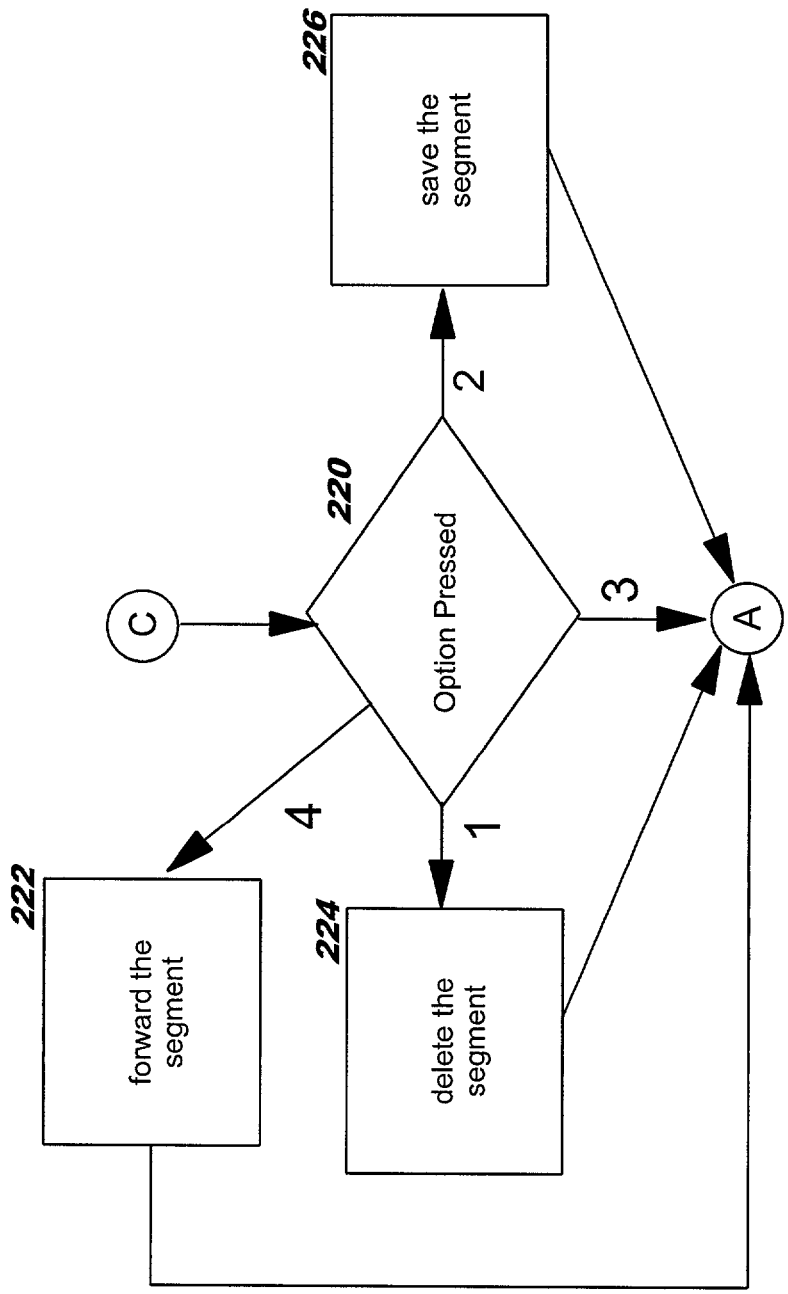
Figure 2C:
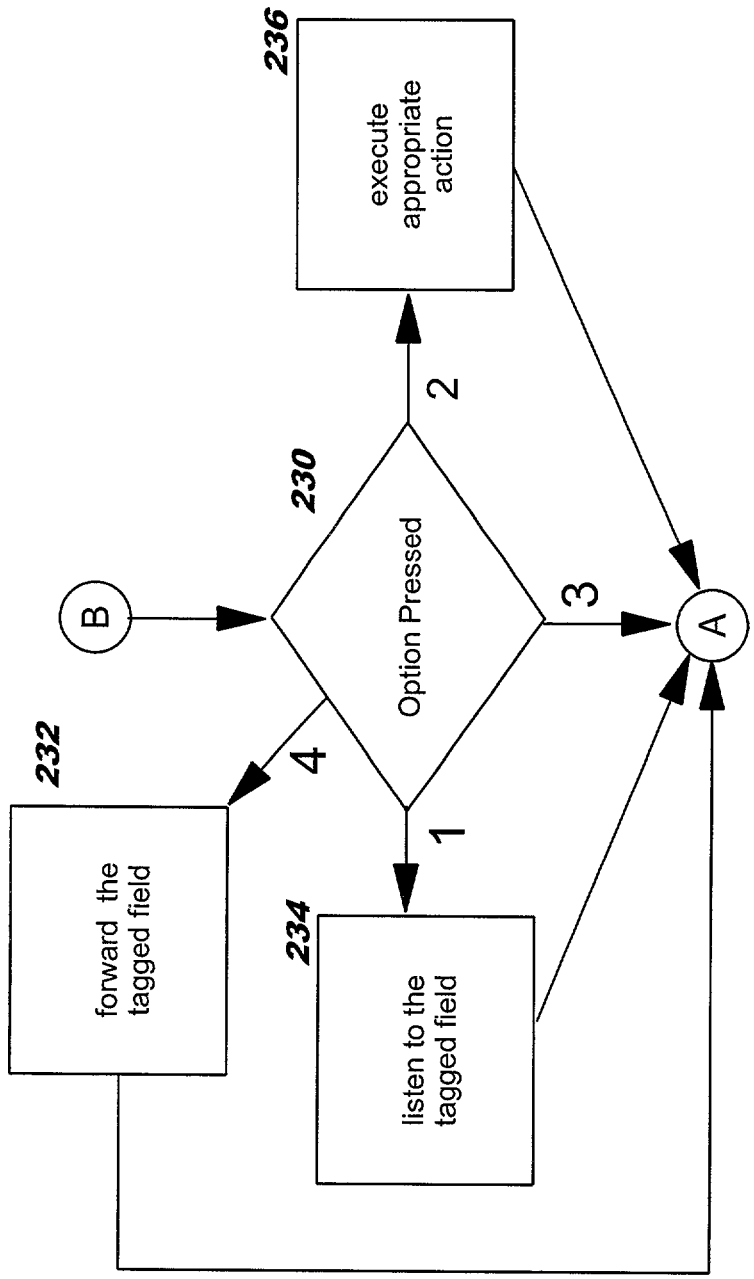

The present invention improves distance communications which use voice mail messages, providing a more flexible and more efficient voice mail system. Use of freeform bookmarks (i.e. bookmarks that may be provided anywhere within a voice mail message) in voice mail messages as disclosed herein enables disambiguating topics during the voice messages. Further, it allows "skimming" of voice mail analogous to a reader skimming the contents of an e-mail message. The disclosed techniques enable rapid navigation of voice mail messages from an ordinary, non-screen telephone, and rapid retrieval of information such as phone numbers or special text from the midst of a voice mail message.

The present invention enables new voice mail features for playing back stored messages. Once segments of voice mail messages have been delineated using bookmarks, the segments can be acted upon individually by the listener. In general, any action that can be taken on a complete voice mail message in the prior art can now be taken on one or more segments of a voice mail message. By bookmarking segments of voice mail messages, the messages become selectively navigable. Thus, the listener may choose to listen to all of her voice mail messages serially (as in the prior art), or can listen to a few seconds of each topic within a message and then skip to the next as necessary using features of the present invention.

With the teachings of the present invention, a number of actions are now supported on partial voice mail messages. For example, the listener can delete or forward partial voice mail messages. This latter capability enables the pertinent part of a message to be forwarded, while allowing the listener to retain privacy on the remainder of the message. A listener may choose a save action on a partial voice mail message, saving only the segments which she wishes to keep. Storage capacity in voice mail systems is often limited, and thus this selective saving technique may enable the listener to better manage her allotted storage. Or, the listener may choose to repeat the playback of individual segments, or to completely skip over segments, etc. The ability to repeat a segment is particularly useful when a listener has listened to a stored voice mail message but has missed noting important information in the caller's message; if that information is bookmarked, the listener may now navigate to it much more efficiently and easily than using the prior art technique of replaying the entire message. To use these partial voice mail message features, at the end or perhaps the beginning of hearing a bookmarked segment, the listener can elect to forward only the previous segment or the upcoming segment to a third party; or to delete, save, or replay the segment; and so forth. Rather than selecting such actions while hearing a voice mail message segment, the listener may alternatively choose such actions selectively, using (e.g.) a numeric identifier of the applicable message segment(s).

A number of different embodiments of the present invention may be implemented using the teachings disclosed herein. Preferred ones of these embodiments, illustrating the advantageous features of the present invention, will now be described.

The present invention may be used to enhance voice mail messages and voice mail systems by explicitly identifying various types of information in a voice mail message. Speakers tend to be less precise in oral speech than they are in written communications. This can be inefficient when communicating using voice mail. When leaving a message, the present invention enables the speaker to disambiguate topics of his voice message. A "keyed alert sequence" ("KAS"), which preferably comprises one or more signals entered by the user from his telephone equipment, is used to signal to the voice mail system (hereinafter, "VMS") that a bookmark of the voice mail message should be created. For example, the KAS signal may be generated by the caller pressing keys or buttons on his telephone to transmit dual-tone multi-frequency (DTMF) tones. Or, selections may be made in any other available manner. For, example, the user may speak a command or command sequence that will be interpreted by a voice recognition process (which may be part of the caller's equipment, or part of the receiving voice mail system) and used as a KAS to generate a bookmark. Alternatively, the caller may have a telephone with a display screen (such as a screen phone or a Web-enabled cellular phone) from which options can be selected, including a touch-sensitive display, and may use this means to send a signal to the voice VMS. The caller's telephone equipment may also be configured or otherwise adapted to automatically transmit certain types of information to the VMS, such as the caller's name and/or preferred callback telephone number, without requiring concurrent intervention from the caller. The present invention discloses use of these types of information as "special indicators" or "special information" which may be used to enhance voice mail messages.

The caller may use a KAS to create a bookmark within his message for a number of different reasons. As one example, a KAS may be transmitted to indicate that the speaker is now changing topics. By bookmarking the topics within a stored voice mail message, a broadside perspective of the stored voice message may be provided to the message listener, as will be described in more detail below, enabling the listener to gain a better understanding of the message and its content. In a message covering multiple topics, the speaker may pause after he has spoken about one topic, generate the KAS (e.g. by pressing the "*" button on his phone), and continue speaking about a new topic.

As another example, the caller may enter a KAS during his message to bookmark a particularly important passage or perhaps just a passage that the speaker wishes to emphasize for some reason. In this usage, the speaker may generate the appropriate alert before (or perhaps after) communicating the important information. In a message with passages of varying importance, a scale such as 1 to 5 may be used, and the speaker may associate the appropriate importance indicator with a segment of his message (e.g. by keying a sequence such as "#3" or "***" to mark the segment as being of importance level 3). Or, a single level of importance indicator may be supported alternatively, where it is assumed that all of the spoken message is of the same (default) importance until the speaker provides a KAS to distinguish a particular passage. As an example of using this approach, a voice command may be given such as "important passage begin" as the caller begins speaking an important passage, and then "important passage end" may be spoken after the important passage has been communicated to the VMS.

Another example of advantageous use of KAS indicators as voice mail bookmarks is in highlighting special information (such as a phone number or an identifier the listener may need to record, or an address such as an e-mail address or a Uniform Resource Locator or "URL") in a voice mail message. By bookmarking the information, the listener can navigate directly to the information he needs or can have it played back to him, without having to hear the entire message again. The types of special information supported may be predefined in a particular implementation, or a number of different indicators may alternatively be provided without having a fixed interpretation thereof. In the former case, the implementation may be adapted to storing a callback phone number after the caller provides a KAS such as "*1" and a callback time and/or date after the caller presses "*2", or a URL when the caller presses "#URL", for example. (A "callback" phone number, as the term is used herein, is a phone number which this caller wishes the listener to use when responding to this voice mail message, and which may differ from the number of the telephone from which the caller is leaving her message.) This approach enables the VMS to explicitly inform the listener of what types of special information have been stored for a particular voice mail message, as well as enabling separate rendering of that information to the listener. Furthermore, the VMS may optionally be adapted to know which of the special topics (if any) is considered required or preferred information, and may prompt the caller to provide this information. When special indicators are provided without a fixed interpretation, the semantic interpretation of the special indicators may perhaps be known only to the caller and the listener, with the VMS enabling announcement, separate playback, and/or navigation to the special information requested by the user. If URLs are supported as a type of special indicator, embodiments of the present invention may optionally provide a feature for automatically establishing a connection to that URL for the listener.

An implementation of the present invention may use KAS indicators for creating voice mail bookmarks for any of the above-described functions (as well as functions which will be obvious once the teachings disclosed herein are known) separately or in combination(s).

In one embodiment, the KAS indicator(s) may be recorded in-line as part of the audio stream (i.e. intermingled within the audio stream). In an alternative embodiment, KAS detection causes the development of metadata (such as an array of codes or pointers) which is associated with the audio stream. These techniques enable the VMS and listener to efficiently navigate the recorded message, and to perform actions selectively on portions of the message. Or, a combination of these techniques may be used. The storage of KAS indicators is described in more detail below, with reference to the sample data structures in FIGS. 5A through 5G.

Reference is now made to FIG. 1, which provides an example that illustrates how a caller may enhance her voice mail message by providing one or more bookmarks to (1) indicate when the topic of her spoken message changes and (2) indicate when she is providing special information such as her callback phone number. As shown in FIG. 1, the caller 100 dials a number (which may be the called party's number, or perhaps a voice mail service to which the called party subscribes), as shown at 102. The call is answered 103 by the VMS 101, and the message recording starts 104. Preferably, the caller begins speaking 105 and provides 106 a KAS at some (arbitrary) call-specific point within the call. (Alternatively, the caller may choose to provide a KAS at the beginning of the call to mark the beginning of her first topic before speaking.) The character "*" is shown in FIG. 1 as the "change topic" KAS, for purposes of illustration and not of limitation. After receiving the KAS which the caller provided at 106, the VMS internally identifies 107 that a new topic has started for this voice mail message. This internal identification may comprise segmenting the voice mail message such that a change-topic bookmark can be associated with the new segment in metadata. Or, the KAS or an interpretation thereof may be inserted in-line within the stored message. (For example, a phrase "new topic" may be programmatically spoken into the recorded message. This programmatic insertion may be performed by the VMS, or by the caller's phone equipment or even by the telephone company as the message is being transmitted to the VMS.) In the preferred embodiment, an entry is created in metadata associated with the message. A data structure of the type depicted in FIGS. 5A-5G may be used for these approaches. (Note that if DTMF tones are used for providing the KAS, the receiving VMS preferably does not store the sound of the DTMF tones for the called party to hear, but rather interprets them and may store them for further programmatic processing.)

The caller then continues speaking the new topic of her voice message (108), which the VMS continues to record. For purposes of illustration, it is assumed that the VMS in FIG. 1 supports both change-topic bookmarks and special indicators, and that this user wishes to explicitly indicate information for special treatment, such as a phone number. At some point during her spoken message, the caller thus provides a KAS such as "#", as shown at 109, to indicate that she is now providing a particular type of special information (indicated in the example as a phone number). In some embodiments, a special or first character such as "#" may indicate that special information is being entered, while an additional character or characters is then provided (e.g. comprising a sequence such as "#11") to identify which special indicator this is. The VMS receives the KAS indicator, and internally identifies 110 that a phone number is about to be entered. The caller then keys in or speaks the phone number 111, after which she preferably provides another KAS—which may be a special KAS defined to signal the VMS of the end of the special information, or which may be a new topic indicator (or another special indicator), as shown in the example at 112. (Alternatively, in some cases the VMS may be adapted to know when the special information is complete. For example, provision of a fixed-length special message may be supported. In such cases, it is not necessary to provide an explicit KAS to signify the end of the special information.)

Upon receiving the change-topic KAS provided at 112, the VMS internally identifies 113 the start of the new topic, and the caller begins speaking 114 the information for that new topic. This process of changing topics and/or providing special information may be repeated a number of times, if desired. When the caller's message is complete, she hangs up 115, and the VMS stops recording this voice mail message, as shown at 116.

Note that while the example scenario provided in FIG. 1 refers to use of special symbols and numbers from the caller's telephone, this is for purposes of illustration and not of limitation. Alternatively, any suitable technique for supplying input from the caller, including use of voice recognition by the receiving VMS to interpret the caller's spoken selection(s) or command(s), may be used instead. Furthermore, a particular implementation of the present invention may choose to support a combination of techniques for input.

While not illustrated in FIG. 1, a particular receiving VMS may choose to prompt a caller to provide special information such as the callback number or the caller's name. In this case, the prompting may occur by a spoken request from the VMS, or by transmitting indicators of another form. Optionally, at 107, 110, and 113, the VMS may provide confirmation to the caller that the KAS tones have been received. This confirmation may be a tone, spoken message, visual display, or other indication. It will be obvious to one of skill in the art how FIG. 1 may be adapted to support either or both of these alternative approaches.

FIGS. 2A-2D provide a flowchart illustrating logic that may be used to implement preferred embodiments of the voice mail playback features of the present invention. This logic is invoked after the listener has already initiated interactions with the enhanced VMS and acts to receive a particular stored voice mail message for this listener, which the VMS has located. The VMS may either proceed through each voice mail message for this particular listener sequentially, or may provide a means for the listener to request processing of individual messages, using prior art techniques. In either case, the features of the present invention allow the listener to process his voice mail messages more quickly and more efficiently. (Note that in the latter case, it is assumed that the means for selecting a message provides only an announcement of message sequence numbers, or perhaps of the phone number from which the message was delivered and its registered owner. The ability to skim the actual content of the messages by subject or to navigate messages based on topics or other special indicators, as disclosed herein, is beyond the scope of the prior art techniques.)

The logic in FIG. 2 assumes that the enhanced VMS supports bookmarks that provide for message segmenting (such as the change-topic bookmarks described above) as well as special tagged fields (i.e. the special indicator types which have been described, such as callback numbers). This logic therefore begins the processing of a voice mail message at Block 200 with the VMS announcing the number of segments and the number of tagged fields which have been stored for this particular message. The announcement may be spoken to the listener, or conveyed in another manner (such as transmitting a numerical indicator or other value for display on the listener's cell phone or other equipment). This announcement gives the listener a sense of the topics to be covered, in a similar manner to how a person viewing her e-mail gets a sense of the message by seeing the paragraph layout. In some preferred embodiments, an array or similar data structure is used for storing bookmarks. In these embodiments, the number of segments and tagged fields may be determined, for example, using a software function that obtains the number of elements in the array. In other embodiments, the segment markers and tags may appear in-line within the message, in which case the VMS preferably processes the message to count the number of segments and tags. (This counting may be done as the message is being spoken and recorded, or in a batch mode after the message is recorded, or as the message is accessed for playback.)

At Block 202, the VMS prompts the listener to see what action he would like to take for this stored message. Block 204 then checks to see which option was selected. A representative set of options is shown in the table in FIG. 3A. As shown therein, the listener may choose to listen to the entire message (as in a prior art VMS); listen to a particular segment; access the tagged fields for the message; or exit. Representative command sequences are also shown in FIG. 3A, by way of example, that may be used in response to the prompting of the VMS. (As will be obvious, the selections shown in FIGS. 3A through 3D, as well as the commands that may be used to request each of these selections, are intended merely as examples.)

If the listener chooses the exit option (using the response "99" in the example), then the processing in FIG. 2A for this voice mail message ends. If the listener chooses to hear a particular segment of the message (using the response "#n", where the value of "n" is a number corresponding to the requested segment), control transfers to Block 206 where this "n-th" segment is played. The listener is then prompted (Block 208) for his next action on this segment. Control then transfers to Block 220 of FIG. 2B, where a test is made to see which action the listener requested for this segment. Representative choices are shown in FIG. 3B. If the listener chooses to delete the segment (option 1), then at Block 224 that segment is deleted from the stored message. If the listener chooses to save the segment (option 2), then at Block 226 that segment is saved (for example, for further reference or further processing). If the listener chooses to forward the segment (option 4), then at Block 222 that segment is forwarded to a third party. (The destination phone number to use for this purpose is preferably obtained from the listener or from other means, using techniques which do not form part of the present invention and which are not shown in FIG. 2B.) After operation of Blocks 222, 224, or 226, or when the listener selects to continue (option 3), control returns to Block 202 of FIG. 2A to enable the listener to continue processing this voice mail message. (Alternatively, an implementation of the present invention may enable control to return to Block 208 of FIG. 2A after Blocks 222, 224, or 226, in order to accept additional segment-related requests from the listener; in this case, selecting "continue" enables the listener to return to the mainline processing at Block 202.)

Returning now to Block 204 of FIG. 2A, if the listener chooses to access a particular tagged field of the message (using the response "*m", where the value of "m" is a number corresponding to the requested tagged field), then at Block 210 he is prompted for the particular type of action he would like to perform on this "m-th" tagged field. The table in FIG. 3D provides representative examples of selections that may be provided. Control then transfers to Block 230 of FIG. 2C, which checks to see which option the listener chose. If he chooses to listen to the tagged field (option 1), then its contents are played (Block 234). If he chooses to forward the contents of this tagged field (option 4), then the contents are forwarded (Block 232) to a third party. (See the discussion of a third party above, with reference to Block 222 of FIG. 2B.) Or, other appropriate actions may be provided, as shown at Block 236 (in response to option 2). The type of other actions, and the manner of carrying out such other actions, may depend on the type of tagged fields supported in a particular implementation.

One use of tagged fields may be to mark certain message content as being confidential or otherwise protected. When this feature is used, the caller preferably identifies the content to be protected at the time of leaving (i.e. speaking) that part of the voice mail message. In this case, it may be desirable to inhibit the listener's use of forwarding for this segment (not illustrated in the segment processing logic of FIG. 2C). Optionally, an implementation of the present invention may provide a similar protection function to be used by the listener, where (for example) the listener may save or mark message segments and/or tagged fields with "do not forward" attributes. This type of special features may be supported for use by callers or listeners, or both if desired. Furthermore, when supported, the feature may be implemented as a (standalone) special tagged field, or it may be supported as an additional indicator that may be associated with an entire message, with individual message segments, and/or with other tagged fields. It will be obvious to one of skill in the art how these optional features may be added to the logic of the FIG. 2. (Note that providing functionality to enforce such functions as "do not forward" is optional. Such functionality may be added to the present invention using techniques which are known in the art.)

After operation of Blocks 232, 234, or 236, or when the listener selects to continue (option 3), control returns to Block 202 of FIG. 2A to enable the listener to continue processing this voice mail message. (Alternatively, an implementation of the present invention may enable control to return to Block 210 of FIG. 2A after Blocks 232, 234, or 236, in order to accept tagged field requests from the listener; in this case, selecting "continue" enables the listener to return to the mainline processing at Block 202.)

Referring again to Block 204 of FIG. 2A, if the listener chooses to play the entire message (using response "#0"), then control transfers to Block 212 where the message is played in its entirety. When tagged field bookmarks and/or topic change bookmarks are embedded in-line in a stored message, then this playback preferably comprises providing the listener with an audible indication of each bookmark. For example, a spoken phrase "topic is changing" may be inserted into the caller's voice message, or a phrase such as "callback telephone number follows" may be inserted. Similarly, when bookmarks are stored as metadata, the metadata processing may include providing an audible indication, announcement, or visual indication during playback of the message. As an alternative to (or in addition to) audibly announcing the bookmark, audio cues may be incorporated in with the message playback (e.g. as background sound), where a change in the audio cue signals to the listener that a bookmarked field is being played. Use of audio cues with the present invention is discussed in more detail below.

Figure 2D:
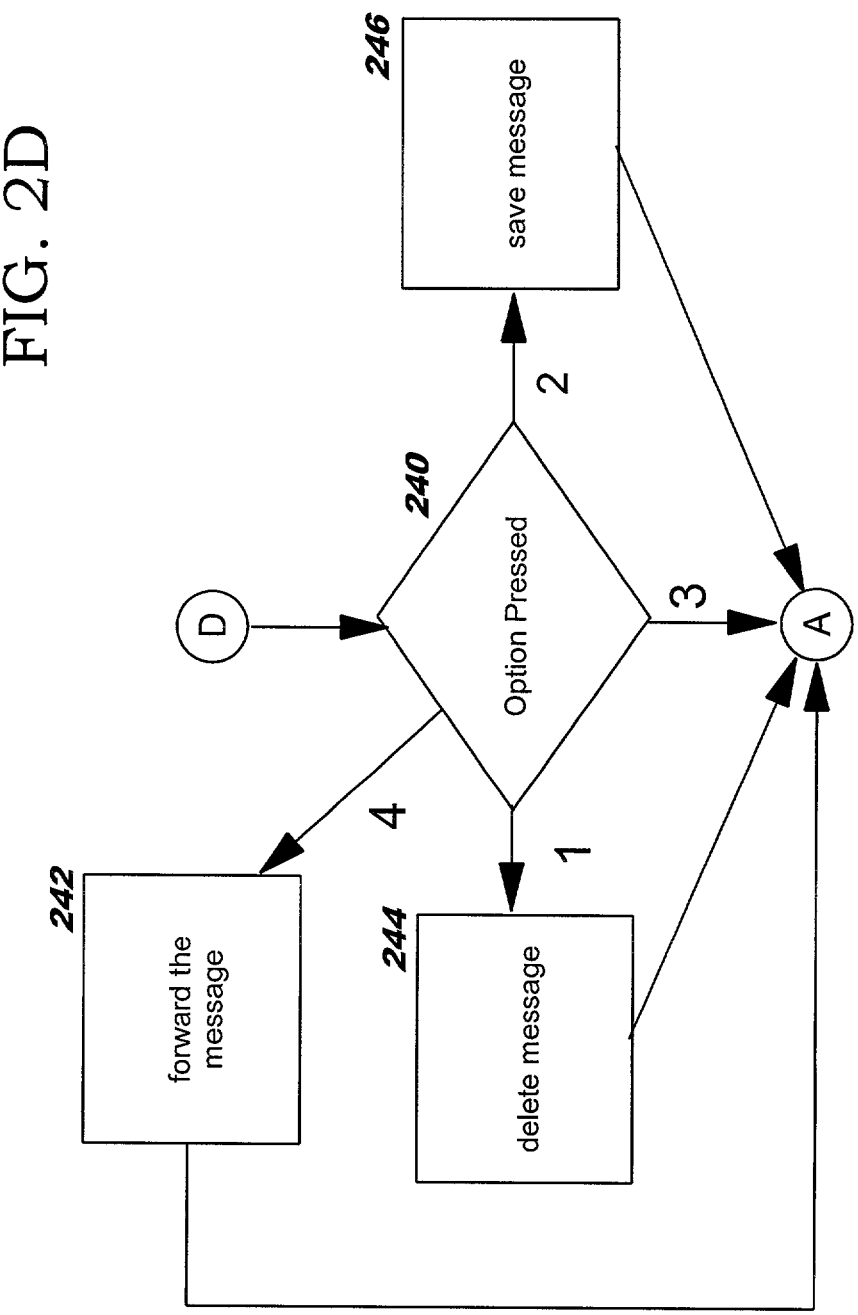

Upon completing the playback, the listener is prompted for his next action (Block 214), after which control reaches Block 240 of FIG. 2D. The table in FIG. 3C provides representative examples of the actions that may be performed on complete messages. Block 240 checks to see what next action was selected. If the listener chooses to delete the entire message (option 1), then it is deleted (Block 244). If be chooses to forward the message (option 4), then the entire message is forwarded (Block 242) to a third party. (See the discussion of a third party above, with reference to Block 222 of FIG. 2B.) If the listener chooses to save the entire message (option 2), then it is saved (Block 246) for later processing or other purposes. After operation of Blocks 242, 244, or 246, or when the listener selects to continue (option 3), control returns to Block 202 of FIG. 2A to enable the listener to continue processing this voice mail message. (Alternatively, an implementation of the present invention may enable control to return to Block 214 of FIG. 2A after Blocks 242, 244, or 246, in order to accept additional requests from the listener which apply to the entire message; in this case, selecting "continue" enables the listener to return to the mainline processing at Block 202.)

The listener may iterate through the logic of FIGS. 2A-2D a number of times, if desired. Upon finishing with this message, the listener preferably chooses a selection such as "99", as stated above. This selection may signal the VMS to proceed to the listener's next stored message, or (if this is the last message) to stop processing messages for this listener. A particular implementation of the present invention may also provide a choice that enables the listener to directly exit the voice mail system at this point; or, a higher-level menu may be used to provide that option.

In another preferred embodiment not illustrated by the figures, the listener may be permitted to play back the message, and barge in with control requests. That is, even though the VMS may not prompt the listener for command responses, the listener may interrupt the message at any point by keying a code (e.g.*) and either in response to a prompt, or without further prompting, select an action to be taken. Such actions may include skipping the current segment, deleting the current segment, proceeding to the next confidential segment, or any other command provided by the VMS. A barge-in feature is well known in the art of VMS, and is used in existing systems to perform such actions as skipping to the end of a message.

If KAS indicators for degrees of importance are supported for message segments, then the VMS may prompt the listener as to whether he would like to listen to (or act upon) segments of one particular importance level. Furthermore, the VMS may announce the degrees which have been used for the segments of a particular message. The listener may choose to listen to only the most important segments of each message or to segments of particular importance levels and so forth.

While these features have not been illustrated in FIG. 2, it will be obvious to one of skill in the art how FIG. 2 may be adapted for this purpose.

Figure 4:
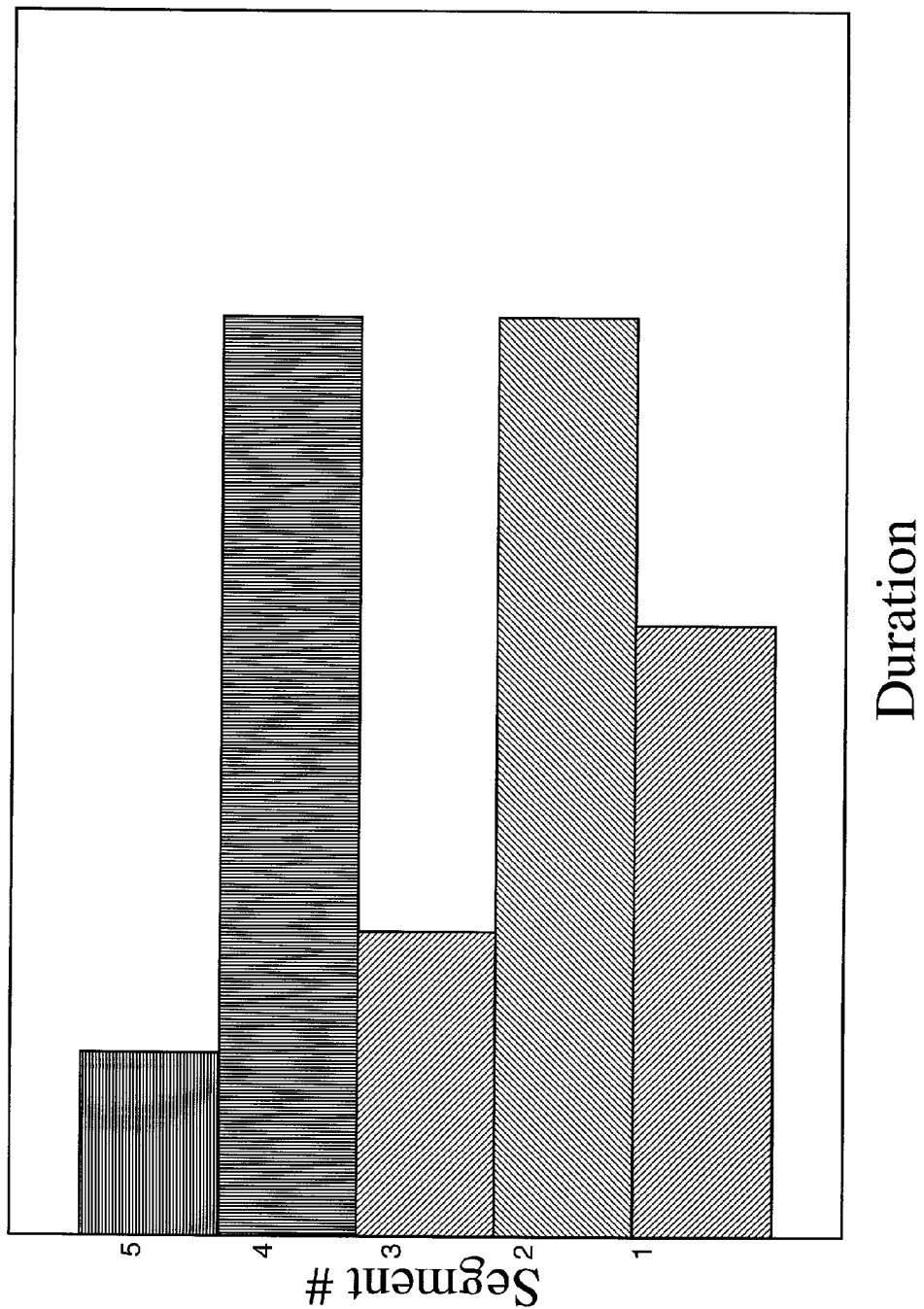
FIG. 4 provides a histogram illustrating message segmenting, as defined by the present invention.

Turning now to FIG. 4, a histogram is depicted which indicates graphically the effect of segmenting a voice mail message. In this example, a stored voice mail message has been divided into 5 segments, and each segment has some unique duration of message playback. Rather than listening to the entire message in sequence, as in the prior art, individual ones of the segments may be played back (or otherwise accessed or acted upon), providing a more flexible and more efficient technique for working with voice mail messages than is available in the prior art.

FIGS. 5A through 5G depict examples of data structures that may be used by an implementation of the present invention. As will be obvious, these are merely one format in which the information may be stored. (In particular, while the data structures are shown as using arrays, is for purposes of illustration only; alternatively, linked lists or other similar structures may be used.)

Figure 5C:
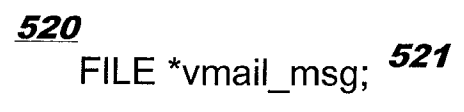

FIG. 5A illustrates a data structure 500 that may be used to process and/or store voice mail segments which have tagged fields, where information about the tagged fields is stored separately from the message contents as metadata (while the contents of the tagged fields are preferably stored in-line within the message). In preferred embodiments, the tagged fields are stored in-line within the message as well. (In this manner, the tagged fields may be efficiently accessed during an in-order playback of the message, and also may be very quickly retrieved by indexing the separate array if necessary—e.g. if the listener requests to perform actions selectively using the tagged fields.) Each message may comprise some number of message segments, where the message is stored in "vmail_array" and the segments are stored as elements of the array (see 504). The contents of "vmail_array" (as well as the information in the structures of FIGS. 5B through 5G) will preferably be stored in temporary storage while processing a particular message and accessing its stored elements using constructs such as the pointers shown in the figures. In addition, information for each message is preferably stored in some persistent data store such as a database, file structure on a disk, flash, etc. (When storing this information in persistent storage, the pointers to files are preferably replaced by file names or other indicators of the location of the referenced information.)

As shown at 503, each "vmail_segment" preferably comprises (1) a pointer to a location (such as a file) in which the data for this segment of the voice mail message is stored (alternatively, the content could be stored in-line, rather than in a separate location), and (2) an array of tagged field information. The pointer may point to a file stored in ".wav" format, or any other appropriate format. The tagged field information, as shown at 502, preferably comprises (1) a type indicator, which may be numeric, to indicate whether this is a phone number, an e-mail address which the caller has provided for responding to the message or which pertains to the message content, a URL, etc., and (2) a pointer to a location where the contents of the tagged field are stored (alternatively, the content could be stored in-line, rather than in a separate location). An upper limit on the size of the tagged field array and the segment array is shown at 501 for purposes of illustration.

The segments of a message may be processed (for example, during playback or when preprocessing for later playback) using an in-order traversal of the arrays shown in the data structures of FIGS. 5A through 5G. Or, the arrays used to store information for each segment may be indexed to selectively locate a particular segment.

FIG. 5B illustrates a data structure 510 that may be used to process and/or store voice mail segments which have tagged fields, where information about the tagged fields is stored separately from the message as metadata but the tagged field contents are stored in the message. In this example, the tagged field contents are accessed using an offset calculation approach. This structure 510 is identical to the structure 500 of FIG. 5A, except in the definition of "tagged_field" 512. In the approach of FIG. 5B, each tagged field is stored with (1) a type indicator, as described for FIG. 5A, (2) an offset specifying the location within the "data_loc" of "vmail_segment" 513 where the data for this tagged field begins, and (3) a length that is used along with the starting offset to determine where the data for the tagged field ends.

The data structure 520 illustrated in FIG. 5C may be used when bookmarks are stored in-line within the voice mail message (perhaps as a spoken interpretation of the bookmark, for example, as discussed above). Preferably, this structure 520 comprises a pointer to a location (see 521), such as a file on disk, where all of the content for a particular message is stored. This file would then be searched to determine the segments, tagged fields, and so forth.

The data structure 530 illustrated in FIG. 5D may be used when bookmarks are used to segment or tag voice mail messages, and pointers to those segments or tags are stored in an array. If an indicator of the bookmark type (which is preferably stored in-line) is also stored in the message, then an interpretation of the bookmark may be provided (such as an announcement to the listener); otherwise, when the bookmark type is not stored in the message with each segment then semantic interpretation of the indicator type is not known (as discussed above). Preferably, this structure 530 comprises an array of a fixed maximum length (see 531 and 532), which is stored in temporary or persistent storage of some type, where the array elements comprise pointers to files which contain the data for each identified part of the voice mail message (or pointers to locations within a single file, which has not been illustrated in FIG. 5D).

FIG. 5E illustrates a data structure 540 which may be used for voice mail messages which have both tagged fields and separate indicators of special types of tagged fields. Each voice mail message comprises an instance of "vmail_msg_struct" 544, which in this example contains separate pointers to locations where the special tagged fields (i.e. the caller's name and callback phone number) are stored, and an embedded array structure used for processing the message contents. This approach assumes that the contents of the special tagged fields have been explicitly obtained or identified (or, alternatively, the pointers may be set to null to indicate an absence of such information); this information may also appear in-line within the message content. Additional special tagged fields may be similarly stored in an analogous manner (or special tagged fields may alternatively be stored in a similar manner to the other tagged fields). Each segment of the message preferably uses the structure "vmail_segment" 543, which comprises a pointer to a location where the structure's content is stored and an array of tagged field information (where the tagged field information is defined at 542). An upper bound on the array sizes is preferably fixed as shown at 541. Refer to FIG. 5A above for a discussion of the tagged field information and the "vmail_segment" information, which is used in an analogous manner for FIG. 5E.

FIG. 5F illustrates a data structure 550 that may be used for voice mail messages that have special types of tagged fields identified, but do not have other tagged fields. As shown at

552, the data structure for such messages preferably comprises explicit pointers to the contents of each of the special tagged fields (in the example, the caller's name and callback phone number, as well as the desired callback time), along with a pointer to a file which stores an array of segments that comprise the in-line content of the voice message. (This special tagged field information may also be stored in-line within the segments of the message.) An upper limit is preferably placed on the size of this array, as shown at 551.

FIG. 5G illustrates a data structure 560 that may be used for voice mail messages that have importance levels associated with segments as a special type of tagged field. As shown at 563, the data structure for such messages preferably comprises an array containing entries for each segment, where an upper limit shown at 561 is placed on the number of such entries. Each entry, shown at 562 using the structure "vmail_segment", preferably comprises an integer value for the importance level of this segment and a pointer to a location where the segment content is stored (although alternatively, the content could be stored in-line within the array element).

Note that the voice mail system may employ a database to contain the voice messages and/or their pertinent information, and the structure of each message and message segment as well as the element types used therein may therefore vary from what is shown in FIGS. 5A through 5G—although the basic stored information is preferably the same.

According to an optional aspect of the present invention, audio cues can be used to provide additional contextual information while a segmented message or a message with tagged fields is being played to a listener. Such cues may be musical (tunes, for example). Or, they may be natural sounds, such as a birdsong, ocean waves, etc. As one example, audio cues can be used to indicate the degree of importance of the message segment. A background hum, incorporated in with the audio stream resulting from the translation, might indicate importance, with higher pitches indicating more important segments and lower pitches indicates less important. As another approach, the pitch or volume of the voice used for the audio rendering might change to indicate that the segment importance varies. Or, a background audio cue might change to a completely different sound while message segments of different importance are being rendered. Audio cues can also be provided for indicating information other than the relative importance of a message segment. As an example, the sound of a ringing phone might be used as an audio cue while a message segment tagged as providing a callback number is played to the listener. Or, the VMS might associate different audio cues with each segment of a delineated message (which provides, for example, for playing a different audio cue per topic). As an alternative, the VMS may simply alternate between two audio cues, with adjacent message segments each having one of the cues. Upon playback of the message to the listener, the audio cues are preferably incorporated in with the spoken message. The association of the audio cues with sections of the message may be done as the message is retrieved for playback (in which case the VMS may perform the incorporating, or it may be done by the listener's telephone equipment, or perhaps by the telephone company); or, the association may be done prior to retrieval, for example by the VMS evaluating its stored messages to determine those which make use of audio cues and then processing those stored messages.

The related invention titled "Selectable Audio and Mixed Background Sound for Voice Messaging System" contains a thorough discussion of use of background sounds, and how such sounds may be selected, located, and processed. Refer to this related invention for more information about options and techniques that may be used for audio cues of the present invention. Note that this related invention is not directed toward inserting an audio cue or sound in-line as message content while a message is being rendered (e.g. a giggle sound in place of a smiley-face emoticon), although this in-line insertion approach for audio cues may be used with the present invention to enhance voice mail messages. Or, the present invention may incorporate an audio cue as additional background sound for a voice mail message that is being rendered—or for some part of a message that is being rendered.

U.S. Pat. No. 5,889,840, entitled "Voice Mail Replay Command System", teaches a technique whereby a caller leaves a voice mail message, and the called party can embed answers within this message and return it to the caller. However, there is no teaching therein of the caller explicitly delineating message segments or of independently performing actions on partial voice mail messages.

U.S. Pat. No. 5,983,187, entitled "Speech Data Storage Organizing System using Form Field Indicators" teaches a technique for capturing and storing speech data records according to "form field indicators", which are elements provided by the speaker (such as a silence of a predetermined length, or pressing a button) to segment a voice data recording. Form field indicators correspond to information in the speech data (see column 4, lines 51-56), and serve as markers or anchors to be used when searching the speech data for a "form field". A form field is a field corresponding to a form-oriented application. For example, a phone book application may comprise form fields of name, phone number, and comment. Using the disclosed technique, the user pauses or otherwise inserts a marker into his speech and speaks a keyword corresponding to one of a set of form fields. The system later processes the speech stream by locating the marker and then searching the spoken phonemes of the following speech data for any of a set of predetermined keywords. Upon finding a phoneme that matches a keyword known to the system, the speech information following that phoneme (up to the point where the next form field indicator is found) is stored into the corresponding form field. (See column 3, lines 13-25; lines 32-34; lines 43-45; and lines 53-64, as well as column 4, lines 12-20.) In this manner, if the user says "My phone number is 800-555-1212" and the phrase "phone number is" has been predefined as a keyword phrase, the system will detect the "phone number is" keyword phrase and store the spoken information "800-555-1212" which follows it into the phone book application's phone number field. Use of form field indicators is stated as being optional, provided that voice recognition is capable of detecting the phonemes of the spoken keyword phrase which introduces the form field content without use of an anchor. (See column 4, lines 44-46.) However, the disclosed techniques do not teach features of the present invention including performing actions on partial voice mail messages; navigation of voice mail messages by a listener wherein (for example) the listener skims from one bookmark to another; using bookmarks to highlight important passages within a voice mail message; announcing information about the stored content of a voice mail message; disambiguating topics using freeform bookmarks; or using audio cues as background sound to provide an audible representation of contextual information during playback to a listener.

U.S. Pat. No. 5,742,736, entitled "Device for Managing Voice Data Automatically Linking Marked Message Segments to Corresponding Applications" teaches a technique for enabling a user to associate speech with a marker type, where the marker type is already associated with an application. A previously-stored voice message (or other type of voice data) is analyzed by a listener, using either a visual representation (e.g. a graphical display such as a line or bar) of a voice message that is being spoken or an audio playback thereof. The user selects from among a set of predefined markers, and associates a marker with a portion of the speech (e.g. by dragging a marker icon in the visual display, or pressing keys while hearing a message played). An application corresponds to each marker, and the user's association automatically causes a linking between the marked speech and storage for the application. For example, if the user determines which part of a visual display corresponds to a recorded phone number, he may drag a phone icon to that segment, and the corresponding stored speech is then linked with the storage structure of a phone book application. In this manner, the stored speech is more easily integrated into existing applications. (See column 4, lines 38-54, as well as column 4, line 64-column 5, line 3.) The present invention, on the other hand, is not directed toward marking a message while it is being played to the listener, but rather while it is being left by the speaker. In other words, the speaker creates the bookmarks of the present invention, while a listener marks or flags portions of messages in the prior art invention. Furthermore, the present invention does not require applications to be associated with bookmarks: the speaker will typically have no idea of the applications available to the listener, or of the applications with which the listener might like to associate the information from a voice mail message. Accordingly, the present invention is not directed at linking information from a voice mail message into the data structure used by an associated application.

U.S. Pat. No. 5,526,407, entitled "Method and Apparatus for Managing Information", teaches a technique for recording, categorizing, organizing, managing, and retrieving written and speech information. This patent teaches an integrated system which provides a graphical user interface to allow a personal computer or tablet user to manage audio data obtained from a meeting or other interaction. The disclosed technique is intended to allow a user (preferably, with a visual interface) to organize audio data; it does not teach bookmarking a voice mail message by the speaker.

As has been demonstrated, the present invention provides advantageous techniques to alleviate disadvantages of distance communication, for example by delineating topics or other significant information in voice mail messages, and for enabling listeners of voice mail messages to more efficiently navigate and process their messages. Once the teachings of the present invention are known, bookmarks in voice mail messages may be used advantageously in a myriad of ways to enhance distance communications.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or flow diagrams of methods, apparatus (systems) and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus, such that some aspects of the present invention operate (for example) at a VMS while other aspects operate the caller's or listener's telephone equipment, or elsewhere.

While preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

We claim:

1. A method of creating a segmented voicemail message comprising:
    with a voice mail system, receiving phone call from a caller;
    recording a verbal message spoken by said caller to said voice mail system via said phone call;
    during the recording of said verbal message, receiving input from said caller that indicates at least one division within said verbal message;
    storing the recorded verbal message as a voicemail message including at least one bookmark at a division within the voicemail message that was entered by said caller during speaking of said verbal message; and
    receiving input from said caller indicating a degree of importance associated with at least one segment of said voicemail message, defined by at least one said division, such that different segments are marked with different degrees of importance.

2. The method of claim 1, wherein said input from said caller comprises tone generated by pressing a button on a phone used by said caller to make said phone call.

3. The method of claim 1, wherein said input from said caller comprises a spoken command indicating a division within said message.

4. The method of claim 1, wherein said division within said message marks a change in a topic of said message.

5. The method of claim 1, further comprising replaying said recorded verbal message for a recipient, including skipping to said bookmark in response to input from said recipient to skip to said bookmark.

6. The method of claim 1, further comprising associating a bookmark with any one of a callback phone number, an email address or a Universal Resource Locator (URL) within the message.

7. The method of claim 1, further comprising forwarding only a selected segment of said message to a designated recipient, said segment of said message being marked by a said division within said message.

8. A system for producing a segmented voicemail message comprising:
  a voicemail system configured to:
    receive a phone call from a caller;
    record a verbal message spoken by said caller to said voice mail system via said phone call;
    during the recording of said verbal message, receive input from said caller that indicates at least one division within said verbal message; and
    store the recorded verbal message as a voicemail message including at least one bookmark at a division within the voicemail message that was entered by said caller during speaking of said verbal message;
  said system being further configured to associate a said bookmark with any one of a callback phone number, an email address or a Universal Resource Locator (URL) within the message.

9. The system of claim 8, wherein said input from said caller comprises tone generated by pressing a button on a phone used by said caller to make said phone call.

10. The system of claim 8, wherein said input from said caller comprises a spoken command indicating a division within said message.

11. The system of claim 8, wherein said division within said message marks a change in a topic of said message.

12. The system of claim 8, said system being further configured to replay said recorded verbal message for a recipient, including skipping to said bookmark in response to input from said recipient to skip to said bookmark.

13. The system of claim 8, said system being further configured to receive input from said caller indicating a degree of importance associated with at least one segment of said message which comprises said at least one division.

14. Th system of claim 8, said system being further configured to forward only a selected segment of said message to a designated recipient, said segment of said message being marked by a said division within said message.

15. A computer program product comprising program code embodied in a computer-useable storage memory, said program code, when executed, causing a voice system to:
  receive a phone call from a caller;
  record a verbal message spoken by said caller to said voice mail system via said phone call;
  during the recording of said verbal message, receive input from said caller that indicates at least one division within said verbal message; and
  store the recorded verbal message as a voicemail message including at east one bookmark at a division within the voicemail message that was entered by said caller during speaking of said verbal message;
  said program code, when executed, further causing a voice mail system to replay said recorded verbal message for a recipient, including skipping to a selected bookmark in response to input from said recipient to skip to that bookmark.

16. The computer program product of claim 15, wherein said input from said caller comprises tone generated by pressing a button on a phone used by said caller to make said phone call.

17. The computer program product of claim 15, wherein said input from said caller comprises a spoken command indicating a division within said message.

18. The computer program product of claim 15, wherein said division within said message marks a change in a topic of said message.

19. The computer program product of claim 15, said program code, when executed, further causing a voicemail system to receive input from said caller indicating a degree of importance associated with at least one segment of said message which comprises said at least one division.

20. The computer program product of claim 15, said program code, when executed, further causing a voicemail system to associate a bookmark with any one of a callback phone number, an email address or a Universal Resource Locator (URL) within the message.

21. The computer program product of claim 15, said program code, when executed, further causing a voicemail system to forward only a selected segment of said message to a designated recipient, said segment of said message being marked by a said division within said message.

* * * * *